United States Patent
Metz et al.

(10) Patent No.: US 7,698,726 B2
(45) Date of Patent: Apr. 13, 2010

(54) BAND LIMITED PORT AGGREGATION IN A DIGITAL RETURN PATH CATV SYSTEM

(75) Inventors: Erik C. Metz, Chalfont, PA (US); Robert L. Howald, Lansdale, PA (US)

(73) Assignee: General Instrument Corporation, Horsham, PA (US)

( * ) Notice: Subject to any disclaimer, the term of this patent is extended or adjusted under 35 U.S.C. 154(b) by 1746 days.

(21) Appl. No.: 10/765,349

(22) Filed: Jan. 27, 2004

(65) Prior Publication Data

US 2005/0166250 A1 Jul. 28, 2005

(51) Int. Cl.
*H04N 7/173* (2006.01)
(52) U.S. Cl. .................. 725/121; 725/126; 725/127; 725/129
(58) Field of Classification Search ............... 725/126, 725/121
See application file for complete search history.

(56) References Cited

U.S. PATENT DOCUMENTS

| | | | | |
|---|---|---|---|---|
| 5,892,865 A * | 4/1999 | Williams | .............. | 385/24 |
| 6,323,793 B1 | 11/2001 | Howald et al. | .............. | 341/137 |
| 6,449,071 B1 * | 9/2002 | Farhan et al. | .............. | 398/79 |
| 6,462,851 B1 * | 10/2002 | West, Jr. | .............. | 398/141 |
| 6,477,182 B2 * | 11/2002 | Calderone | .............. | 370/481 |
| 7,231,655 B2 * | 6/2007 | Brooks | .............. | 725/114 |
| 7,333,475 B2 * | 2/2008 | LeBlanc et al. | .............. | 370/352 |
| 2003/0046707 A1 * | 3/2003 | Shalvi et al. | .............. | 725/111 |
| 2003/0154494 A1 * | 8/2003 | Sage | .............. | 725/120 |
| 2003/0156602 A1 * | 8/2003 | Sage | .............. | 370/480 |

* cited by examiner

*Primary Examiner*—Andrew Y Koenig
*Assistant Examiner*—Ricky Chin
(74) *Attorney, Agent, or Firm*—Larry T. Cullen

(57) ABSTRACT

A method and system for multi-port aggregation in a digital return path CATV system digitizes each of a plurality of return path signals, splits each of the plurality of return path signals into a low band and an upper band (41), combines each of the plurality of low band signals to form a combined low band signal (43), downconverts each of the plurality of upper band signals from an original frequency range into a new downconverted frequency range (45) and time division multiplexes the plurality of downconverted upper band signals with the combined low band signal to form an aggregate data stream (46).

16 Claims, 5 Drawing Sheets

BAND LIMITED PORT AGGREGATION IN A DIGITAL RETURN PATH CATV SYSTEM

FIELD OF THE INVENTION

The present invention relates generally to a cable television hybrid-fiber-coax (CATV HFC) return path system that uses digital conversion and transport. More particularly, the present invention describes a technique that provides the ability to transport multiple return path signals, from a multi-port optical node for example, using reduced transmission rates.

BACKGROUND

Cable Television (CATV) networks have been undergoing rapid upgrading, particularly in North America, in order to provide advanced services, such as digital video, telephony and Internet services. A major part of the upgrade cycle has been the development of the return path network—the path from residential subscribers to the CATV Headend. Previously, this portion of the network was used little, generally only for minor maintenance and billing operations. As interactivity needs grew and CATV technology advanced, this portion of the network became more significant. Now, the return path forms a critical portion of the system for two-way interactivity, such as telephony and data traffic.

The current field implementation of digitized return path solutions for HFC fiber nodes employs a direct digitization and transmission of the entire return path signal spectrum. Some instances of this implementation can provide a means for digitizing two of these signals, and transmitting both using Time Division Multiplexing of the digital signals. Each of these digitized return path signals can typically generate a digital signal rate anywhere in the range of 800 Mbps to 2.25 Gbps depending on the signal band, sampling rate and the number of bits used to sample each signal. When combining two or more of these signals, the aggregate digital signal rate can increase beyond the capabilities of existing low-cost digital and optical transport platforms. This situation perpetuates as technologies evolve, because enhanced services become possible that are enabled with such technology improvements. Furthermore, decreasing the bit rate of optical transport would represent cost saving opportunities.

The present invention is therefore directed to the problem of developing a method and apparatus for transmitting multiple return path signals, from a multi-port optical note for example, using lower data rate components and lasers than would normally be possible to send the information.

SUMMARY OF THE INVENTION

The present invention solves these and other problems by providing a method for multi-port aggregation in a digital return path CATV system, the method digitizing each of a plurality of return path signals, splitting each of the plurality of return path signals into a low band and an upper band, combining each of the plurality of low band signals to form a combined low band signal, downconverting each of the plurality of upper band signals from an original frequency range into a new downconverted frequency range and time division multiplexing the plurality of downconverted upper band signals with the combined low band signal to form an aggregate data stream.

In one embodiment the method further includes the steps of serializing the aggregate data stream and transmitting the serialized aggregate data stream to a receiver. A further embodiment includes the step of receiving the low band signals at a digital to analog converter and outputting a single RF return stream low band signal.

A further embodiment of the invention upconverts each of the plurality of upper band signals to the original frequency range of the upper band signals, receives each of the plurality upper band signals at a digital to analog converter, outputs an RF return stream signal for each of the plurality of signals and combines the single RF return stream low band signal with each of the plurality of RF return stream signals for each of the plurality of upper band signals to form a full return band signal for each of the upper band outputs.

According to one aspect of the present invention, parameters determining the split frequency for the low band and upper band, and an upper bound on the upper band, are programmable. In yet another aspect of one embodiment of the invention, a parameter determining the sample resolution of the step of downconverting each of the plurality of upper band signals from an original frequency range into a new downconverted frequency range is programmable.

The present invention further provides a system for transmitting multiple return path signals using lower data rate transmitters, including a converter for digitizing each of the multiple return path signals, a processor for processing/bandsplitting each of the multiple return path signals into respective low and high bands, and adding the low bands to form an aggregate low band signal, a multiplexer for time division multiplexing the aggregate low band signal with each high band signal to form a combined data stream and a transmitter for transmitting the combined data stream.

In one embodiment the processor is a digital processor and in another embodiment the processor consists of digital and analog components.

In a further embodiment the system includes a digital to analog converter at a receiver end to receive the low band signals and output a single RF return stream low band signal, and, in yet a further embodiment, the digital to analog converter at the receiver end receives each of the plurality upper band signals and outputs an RF return stream signal for each of the plurality of signals.

According to yet another aspect of the invention the processor may be programmed to determine the split frequency for the low band and upper band, and an upper bound on the upper band, and may also be programmed to determine a sample resolution to downconvert each of the plurality of upper band signals from an original frequency range into a downconverted frequency range.

DETAILED DESCRIPTION

It is worthy to note that any reference herein to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
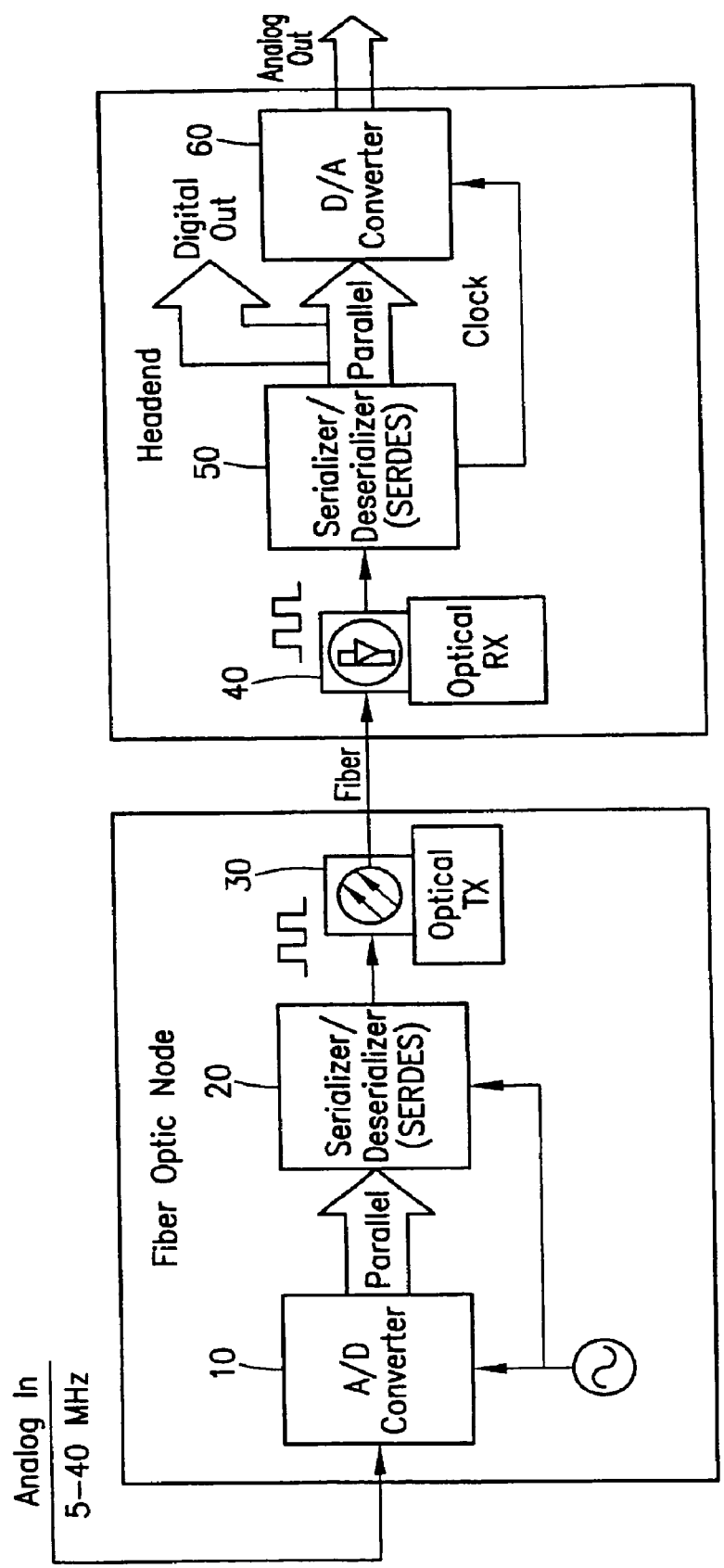
FIG. 1 depicts the basic elements of a digitized return path HFC architecture in a cable television communications system.

U.S. Pat. No. 6,323,793 discloses an enhanced approach to return path design and presents a way to architect the return path portion of the system. This patent is hereby incorporated by reference as if repeated herein in its entirety, including the drawings. FIG. 1 shows a block diagram of such a system. The use of this digital optical technology provides many key advantages compared to traditional analog systems. Among these are longer network distances, performance insensitivity to distance, environmental robustness, cost advantages, and standards-based interfaces. In addition, digital return path systems provide the flexibility necessary for the introduction of further advances in technology.

When combining two or more digitized return path signals, the aggregate digital signal rate can be quite large. In addition, the higher the data rate, the faster the components and the digital laser are required to operate. Those skilled in the art will appreciate that the faster the parts need to operate, the more expensive the parts. In some cases, the requisite speed may be greater than the available speed at the time the need arises.

Figure 2:
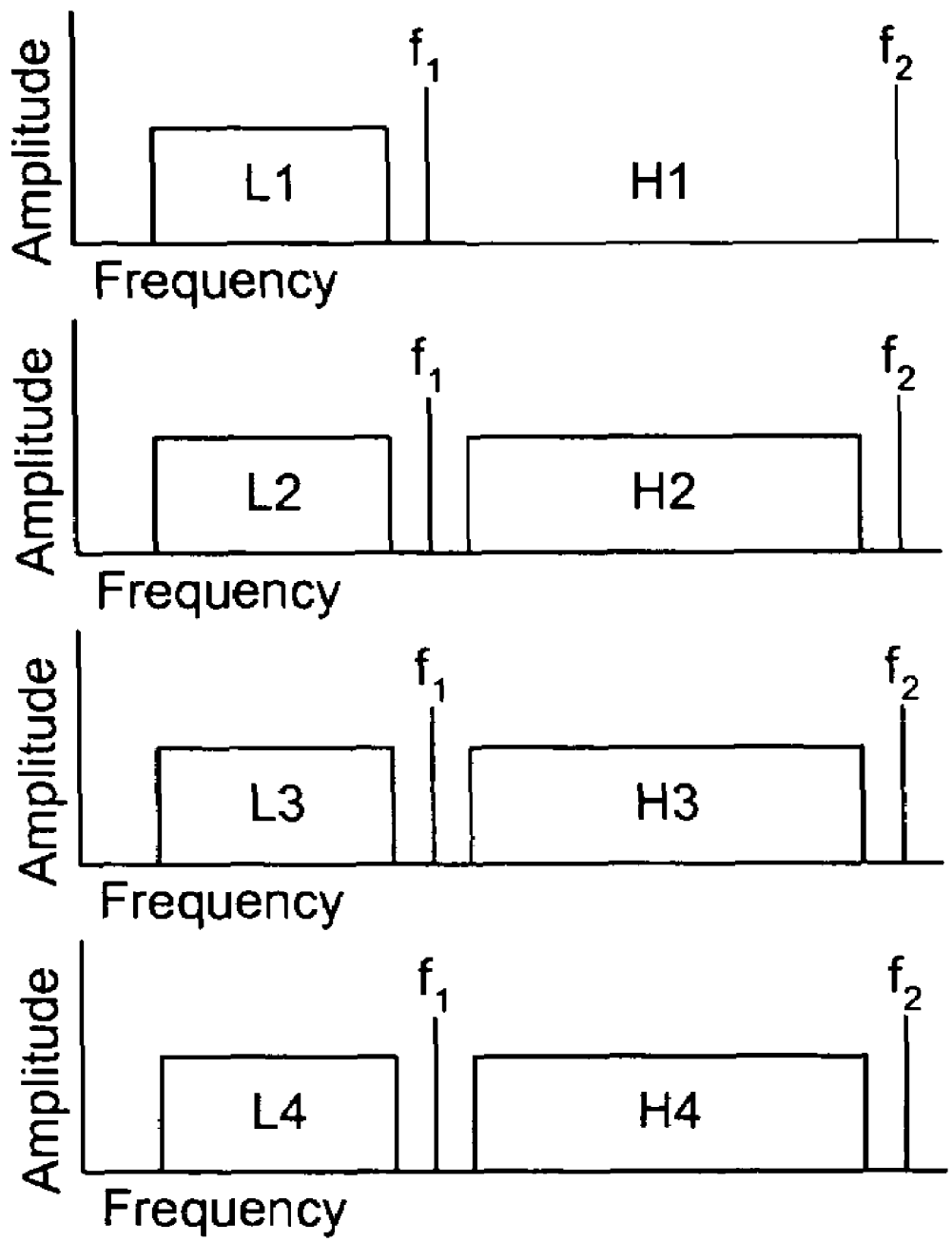
FIG. 2 depicts four return path signal spectrum, according to one aspect of the present invention, each having an upper bound on the band $f_2$ and a split frequency labeled $f_1$, and each band split into a low band and a high band, labeled L1-L4 and H1-H4 respectively.

One solution to this problem is to determine a portion of each of the desired return path signals to be uniquely transmitted, while the remainder of the band is combined with the other remainders. FIG. 2 depicts four return path signal spectrum. Each has an upper bound on the band $f_2$ and a split frequency labeled $f_1$. To obtain the illustrated four return path signal spectrum shown, each band is split into a low band and a high band, labeled L1-L4 and H1-H4 respectively.

In practice, the lower portion of the band has been used for simple modulation schemes such as Biploar Phase Shift Keying (BPSK), Quadrature Phase Shift Keying (QPSK), or Frequency Shift Keyed (FSK) due to lack of any constraints on band occupancy or channel format, and because of known additional noise and ingress in the low band. These channels also typically carry a very low average traffic load. The higher bands have been used for more advanced modulation schemes, such as Quadrature Amplitude Modulation (QAM), as well as higher rate QPSK.

The specific point ($f_1$) at which the band is split can be determined and configured on a case-by-case basis. Each of the lower portions of the band L1 through L4 is combined to form a new signal, L0, and each of the high bands will remain individual, thus the total return will consist of L0, H1, H2, H3 and H4. Specifically, each return band is digitized using a high speed analog to digital (A/D) converter and is sent to one or more Field Programmable Arrays (FPGA) for processing, band splitting and channelization. Each of the lower bands is then arithmetically summed together, and sample resolution adjusted for maximum data rate savings. Finally, all of the bands are time division multiplexed together, and the resulting data stream is sent to a serializer and then to a laser transmitter for transmission to the application receiver.

As noted above, the low band traditionally has more simplistic modulations schemes—therefore, the new low band L0 can be effectively encoded with fewer bits of resolution per sample then the higher bands. This resolution can be modified on the new L0. Additionally, the low traffic load in this band permits such combining with no significant performance degradation. In fact, systems employing these low band communications have been engineered to support this approach. The savings of not having to transmit each of the lower bands, and a reduced resolution of the lower band, can provide a significant rate reduction in the final aggregate rate that can provide enough savings to allow this implementation to proceed using a lower class (or speed grade) of products, making the design more achievable and affordable. The techniques that are available to perform this can be performed in the digital domain (post digitization, via Digital Signal Processing, DSP, techniques) or a combination of analog (filters and mixers) and digital.

A preferred specific embodiment of the invention would be comprised of an all-digital solution. One specific exemplary implementation of the invention would be comprised of a four port optical node with an NTSC return band split of 42 MHz. Each return path signal would be digitized using roughly a 100 Megasample-Per-Second (Msps) 10-bit analog to digital converter, creating a 1000 Mbps data stream for each return. A four way TDM of these signals would require 4 Gbps transmission. Each of these digitized signals would be sent to a DSP process. Using DSP techniques, each return band would be split into a high and a low band (this is sometimes referred to as channelization). The split frequency may be set at 20 MHz.

The low bands L1 through L4 are then digitally combined (arithmetically added together) to form the new band L0. L0 would then undergo a resolution reduction if necessary to reduce the overall data rate, from, for example, 10 bits to 8 bits. L0 represents a 20 MHz lowpass. When sampled with 8 bits at Nyquist rate plus 10%, the result is approximately 368 Mbps.

Figure 3:
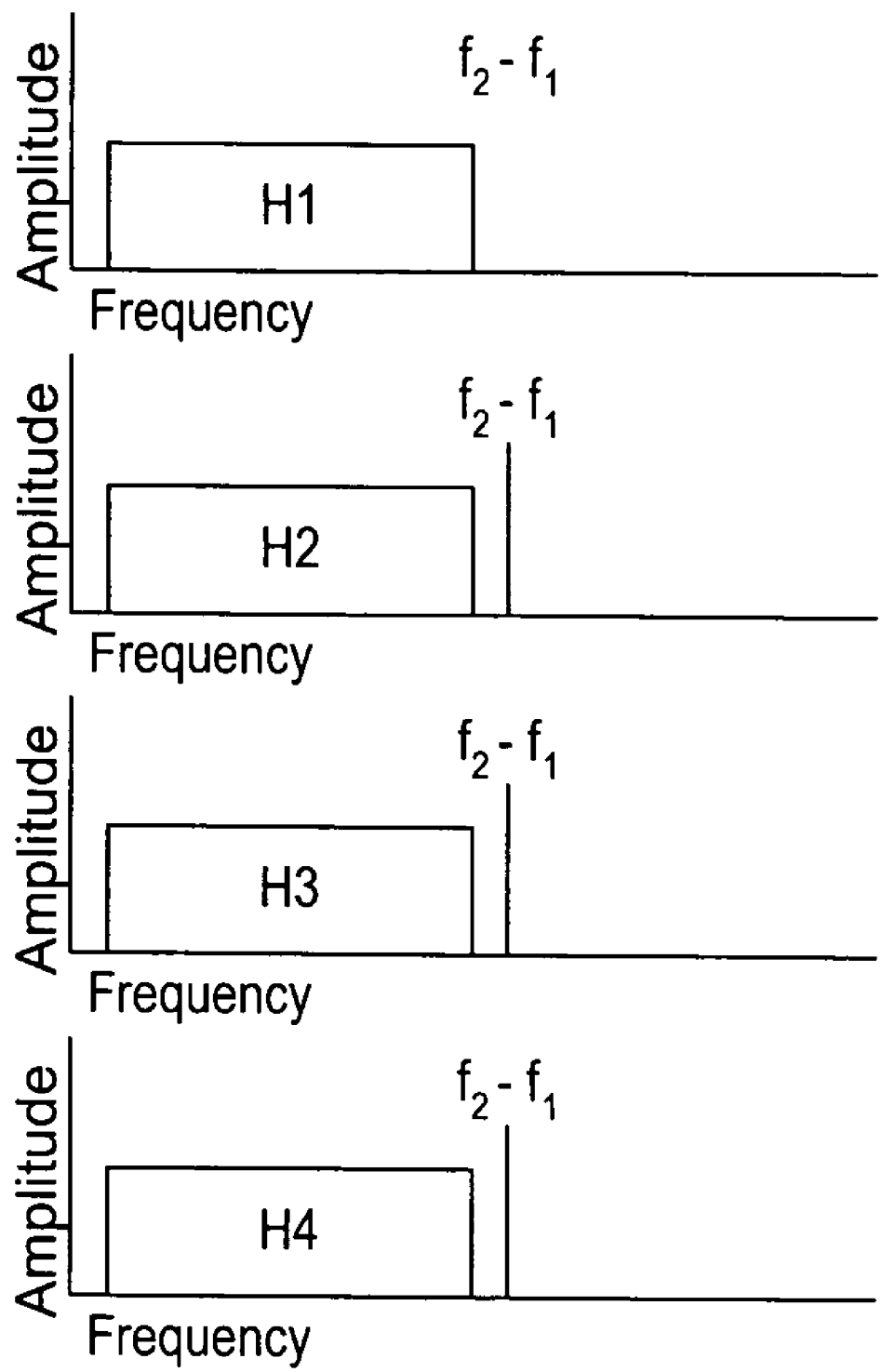
FIG. 3 shows each of the upper bands down-converted, to represent a new band of a lowpass spectrum, to $f_2-f_1$ (e.g., 42–20, or 22 MHz of bandwidth).

Each of the upper bands would then be down converted to represent a new band comprising a lowpass spectrum to $f_2-f_1$ (42–20), or 22 MHz (see FIG. 3). Each of these bands represents 22 MHz of bandwidth. When sampled with 10 bits at Nyquist plus 10% yields approximately 490 Mbps. Each of these return bands is then time division multiplexed (TDM'd) with each other to form an aggregate data stream of ((4×490)+368) or 2328 Mbps. Significantly, this is below 2.4 Gbps, as many components and lasers are currently standardized around this data rate (of course, simple changes in clock rate and processing can easily achieve precise transport rate matches to available components).

The combined data stream is then transmitted, using a digital laser, to a receiver at the receive end of the return network. The receiver de-multiplexes each of the five data streams. The low band L0 is sent to a digital to analog converter (DAC), and is output as a single RF return stream. Each of the high bands must first be digitally up-converted, back to the original frequency range between $f_1$ and $f_2$, prior to being sent to the digital to analog converter. Each of the high bands is then output as an individual RF signal.

In a further embodiment, the low band may be combined with each of the high bands to form a full return band for each of the high band outputs. This may be desirable depending on the type of application receiver that the signal is being sent to.

In yet a further embodiment, each of the parameters could be configurable, or downloadable, on a case-by-case basis. Programmability in real time, or near real time may be desired. For each upper bound of the return signal, the split frequency and the sample resolution may be selected to conform to a specification that may be defined for either parts availability, cost or other gating factors. The implementation should not be limited to a specific number of return path signals, nor should the implementation be limited to fiber optic node locations.

Method for Transmitting Multiple Return Path Signals Using Lower Data Rate

Figure 4:
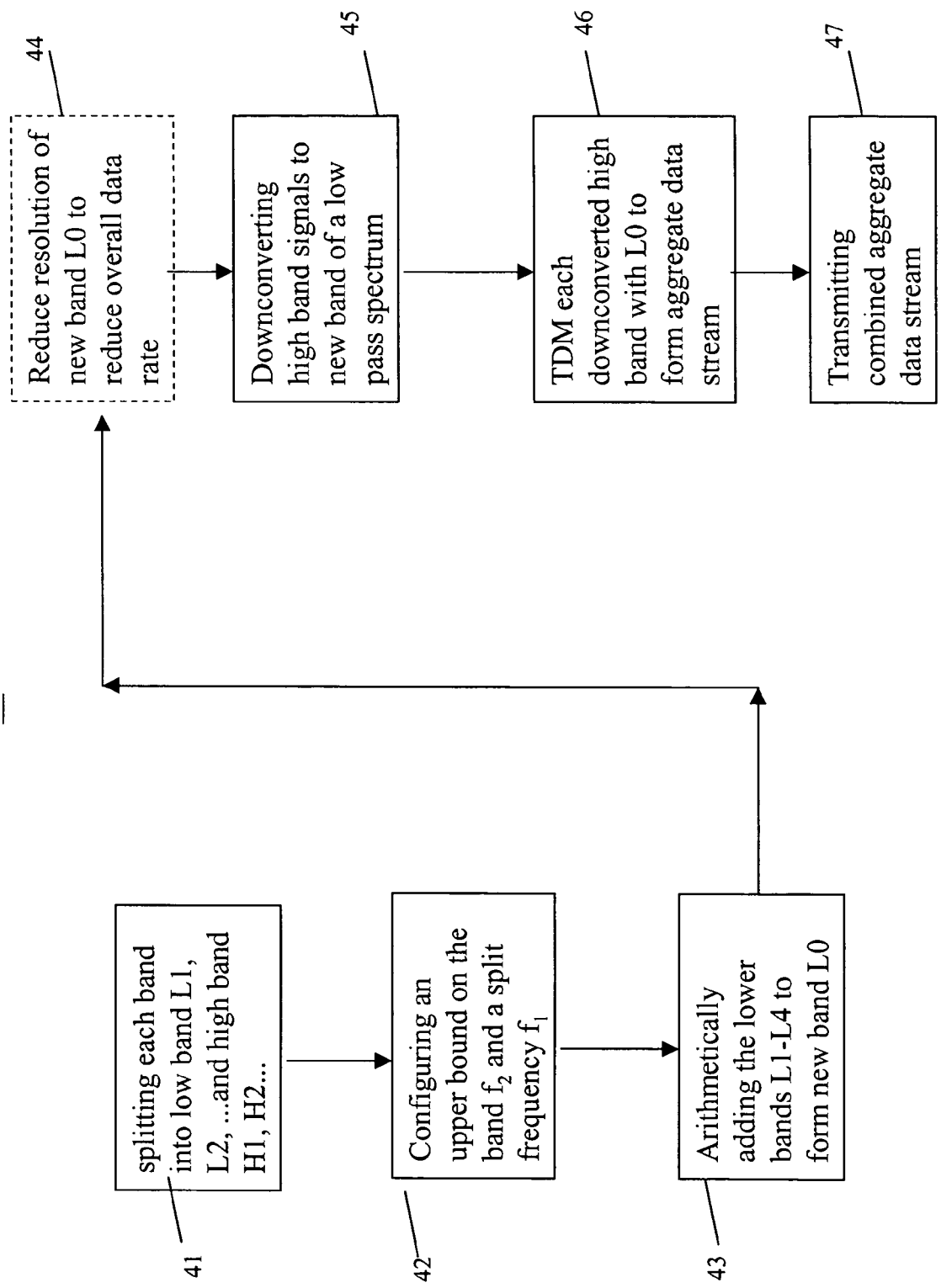
FIG. 4 shows an exemplary embodiment of a method for transmitting multiple return path signals using a lower data rate, illustrating the steps performed at the node according to one aspect of the present invention.

Turning to FIG. 4, shown therein is a method for transmitting multiple return path signals using a lower data rate. The process 40 begins by splitting each return band (that has been previously digitized using a high speed A/D converter) into a low band and a high band L1-L4, and H1-H4, respectively (i.e., "channelization") (step 41) and configuring an upper bound on the band $f_2$ and a split frequency $f_1$ (step 42).

Next, the process digitally combines (i.e., arithmetically adds) the lower bands L1-L4 to form a new band L0 (step 43). The new band L0 then undergoes a resolution reduction (if necessary) to reduce the overall data rate (step 44). After combining the low band signals to form L0, the high band signals, which remain individual, are each downconverted to represent a new band of a lowpass spectrum to $f_2-f_1$ (for example, (42 MHz–20 MHz), or 22 MHz of bandwidth (see FIG. 3)) (step 45).

Each downconverted high band is then combined (e.g., time division multiplexed, TDM'd) with L0, thereby forming an aggregate data stream such that the total return consists of L0, H1, H2, H3 and H4 (step 46). The combined data stream may then be transmitted using a digital laser, to a receiver at the receive end of the return network (step 47).

Figure 5:
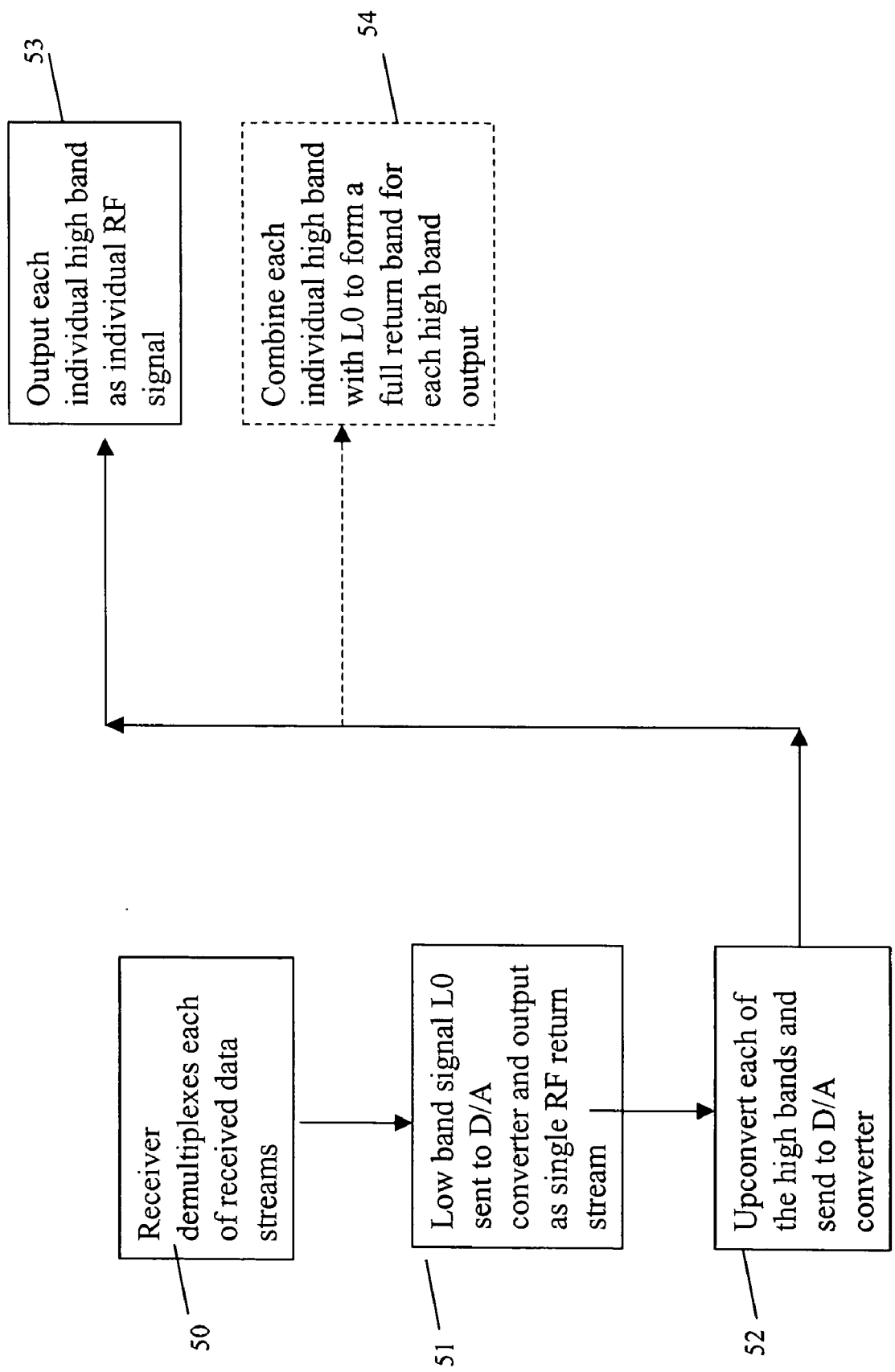
FIG. 5 shows an exemplary embodiment of a method for transmitting multiple return path signals using a lower data rate, illustrating the steps performed at the application receiver according to another aspect of the present invention.

Continuing to FIG. 5, at the receiver side, the receiver de-multiplexes each of the received five data streams (step 50). The low band L0 is sent to a digital to analog converter (DAC), and output as a single RF return stream (step 51). Each of the high bands must first be digitally up-converted, back to the original frequency range between $f_1$ and $f_2$, prior to being sent to the digital to analog converter (step 52). Each of the high bands is then output as an individual RF signal (step 53). Optionally, the low band may be combined with each of the high bands to form a full return band for each of the high band outputs (step 54), which may be desirable depending on the type of application receiver that the signal is being sent to.

The process enables a portion of each of the desired return path signals to be uniquely transmitted, while the remainder of the band is combined with the other remainders, thereby providing a significant rate reduction in the final aggregate rate that can provide enough savings to allow the implementation to proceed using a lower class (or speed grade) of products, making the design more achievable and affordable.

CONCLUSION

Digital return systems are becoming more prevalent in CATV return systems because of the many advantages they offer in terms of performance, cost and flexibility. Traditionally, the lower portion of the return band utilizes simple modulation schemes and is typically avoided due to ingress noise. However, the higher portion of the band is being utilized with more advanced modulation schemes to offer the next generation of services. With higher field penetration of the next generation of services, the need to offer individual port aggregation increases.

Although various embodiments are specifically illustrated and described herein, it will be appreciated that modifications and variations of the invention are covered by the above teachings and are within the purview of the appended claims without departing from the spirit and intended scope of the invention. For example, the present invention has been described in relation to optical nodes, however, the same technique could be applied to hub-based applications, which could provide an order of magnitude greater aggregation. Similarly, applications involving CATV forward path transport technologies also are natural candidates for these concepts, since multiplexes of broadcast (common, combined) and narrowcast (segmented) signals being transported are typical. Furthermore, this example should not be interpreted to limit the modifications and variations of the inventions covered by the claims, but is merely illustrative of one possible variation.

What is claimed is:

1. A method for multi-port aggregation in a digital return path CATV system, the method comprising the steps of:
    digitizing each of a plurality of return path signals;
    splitting each of the plurality of the digitized return path signals into a respective plurality of low band signals and upper band signals;
    digitally combining each of the plurality of low band signals to form a combined low band signal;
    downconverting each of the plurality of upper band signals from an original frequency range into a new downconverted frequency range;
    time division multiplexing the plurality of downconverted upper band signals with the combined low band signal to form an aggregate data stream.

2. The method of claim 1, further comprising the step of serializing the aggregate data stream.

3. The method of claim 2, further comprising the step of transmitting the serialized aggregate data stream to a receiver.

4. The method of claim 3, further comprising the step of receiving the low band signals at a digital to analog converter and outputting a single RE return stream low band signal.

5. The method of claim 3, further comprising the step of upconverting each of the plurality of upper band signals to the original frequency range of the upper band signals.

6. The method of claim 5, further comprising the step of receiving each of the plurality upper band signals at a digital to analog converter and outputting an RF return stream signal for each of the plurality of signals.

7. The method of claim 6, further comprising the step of combining the single RF return stream low band signal with each of the plurality of RF return stream signals for each of the plurality of upper band signals to form a full return band signal for each of upper band outputs.

8. The method of claim 1, wherein parameters determining the split frequency for the low band signal and upper band signal, and an upper bound on the upper band signal, are programmable.

9. The method of claim 1, wherein a parameter determining sample resolution of said step of downconverting each of the plurality of upper band signals from an original frequency range into a new downconverted frequency range is programmable.

10. A system for transmitting multiple return path signals using lower data rate transmitters, the system comprising:
    a converter for digitizing each of the multiple of return path signals;
    a processor for processing/band-splitting each of the multiple of return path signals into respective low band signals and high band signals, and digitally adding the low band signals to form an aggregate low band signal;
    a multiplexer for time division multiplexing the aggregate low band signal with each high band signal to form a combined data stream;
    and a transmitter for transmitting the combined data stream.

11. A system according to claim 10, wherein said processor comprises a digital processor.

12. A system according to claim 10, wherein said processor comprises digital and analog components.

13. A system according to claim 10, further comprising a digital to analog converter at a receiver end to receive the low band signals and output a single RF return stream low band signal.

14. A system according to claim 10, further comprising a digital to analog converter at a receiver end to receive each of the plurality upper band signals and output an RF return stream signal for each of the plurality of signals.

15. A system according to claim 10, wherein said processor may be programmed to determine the split frequency for the low band signals and upper band signals, and an upper bound on the upper band signals.

16. A system according to claim 10, wherein said processor may be programmed to determine a sample resolution to downconvert each of the plurality of upper band signals from an original frequency range into a downconverted frequency range.

* * * * *